Nov. 21, 1933.        J. C. McCUNE        1,935,808
FLUID PRESSURE BRAKE
Filed June 21, 1929
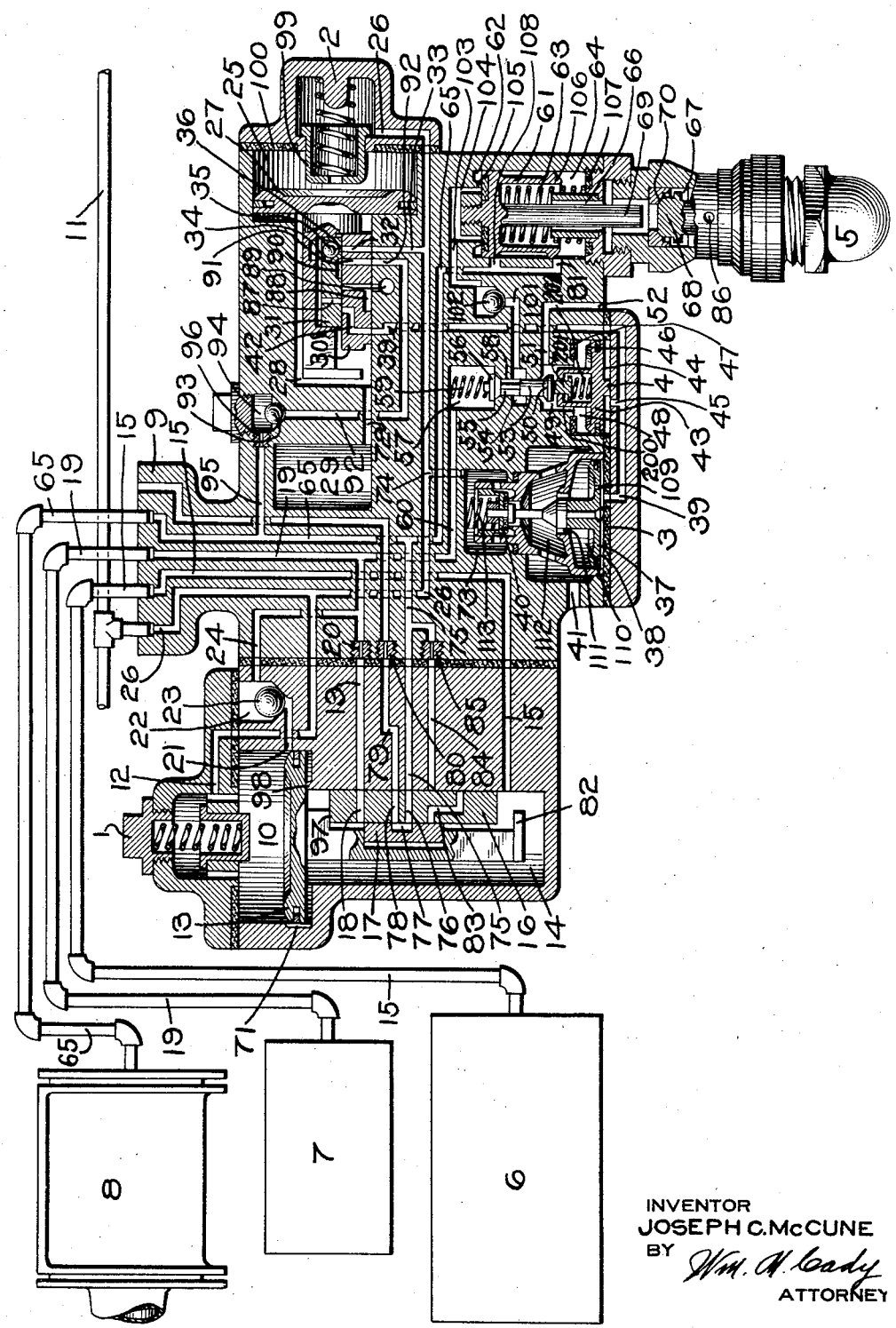
INVENTOR
JOSEPH C. McCUNE
BY
Wm. A. Cady
ATTORNEY Patented Nov. 21, 1933

1,935,808

UNITED STATES PATENT OFFICE 1,935,808

FLUID PRESSURE BRAKE

Joseph C. McCune, Edgewood, Pa., assignor to The Westinghouse Air Brake Company, Wilmerding, Pa., a corporation of Pennsylvania Application June 21, 1929. Serial No. 372,593

17 Claims. (Cl. 303—46)

This invention relates to fluid pressure brakes and more particularly to a valve device for controlling the application and release of the brakes.

This application is a continuation in part of my copending application, Serial No. 353,418, filed April 8, 1929.

It has heretofore been proposed to provide a valve device of the above character in which the means for effecting a service application of the brakes and the means for effecting an emergency application of the brakes, operate independently of each other, and in which a higher brake cylinder pressure is obtained when an emergency application of the brakes is effected than when a service application is effected.

In the construction of valve devices of this character, two valve mechanisms may be employed, one of which is adapted to control communication by which fluid under pressure is supplied to the brake cylinder from the auxiliary reservoir to effect a service application of the brakes, while the other valve mechanism is adapted to control communication by which fluid under pressure is supplied to the brake cylinder from a supplemental or emergency reservoir to effect an emergency application of the brakes.

In such type of valve mechanism, means may be provided for limiting the amount of fluid pressure supplied to the brake cylinders in effecting a service application of the brakes, but when an emergency application is initiated the pressure limiting means are rendered ineffective so that high fluid pressure will be supplied to the brake cylinders.

Furthermore, the valve device may be so designed that the emergency valve mechanism is ineffective when a service application of the brakes is initiated, but when a sudden reduction in brake pipe pressure is produced, the quick action valve device and the high pressure valve device of each equipment are operated in the well known manner, so as to respectively cause a quick serial venting of the brake pipe, and to establish communication from the emergency or supplemental reservoir to the brake cylinder.

In cases where the quick action chamber of the emergency valve mechanism is charged from the brake pipe through ports in the slide valves controlled by the emergency piston when the device is in release position, it is of advantage to maintain the high fluid pressure in the quick action chamber when the brake pipe pressure is reduced in effecting an application of the brakes and before the emergency valve mechanism is actuated to cut off the communication between the brake pipe and the quick action chamber.

The usual triple valve device comprises a main slide valve, an auxiliary slide valve having a movement relative to the main valve, and a piston subject to the opposing pressures of the brake pipe and a reservoir, for operating the slide valves. As heretofore constructed, the slide valves of the triple valve device are provided with ports for controlling the supply and release of fluid under pressure to and from the brake cylinder, and these ports are of such size as to give the desired rate of flow for a given sized brake cylinder. As a consequence, a different triple valve device having the required port areas must be provided for each size brake cylinder. According to one feature of my invention, means are provided whereby the same triple valve device may be employed regardless of the size of the brake cylinder.

An object of the invention is to provide an improved valve device of the type mentioned having means for preventing back flow of fluid under pressure from the quick action chamber to the brake pipe.

Another object of the invention is to provide a fluid pressure valve device in which the quick action valve device and the high pressure valve device are actuated simultaneously when an emergency application of the brakes is initiated.

Another object of the invention is to provide a triple valve device and means separate from the slide valves of the triple valve device for regulating the rate of flow of fluid under pressure to and from the brake cylinder, so that a triple valve device having slide valves provided with the same port areas may be employed for all sizes of brake cylinders.

Another object of the invention is to provide a triple valve device of the type specified having removably mounted means for controlling the flow rate of the fluid passing therethrough.

Another object of the invention is to provide a triple valve device of the above type in which a single valve in adapted to be operated upon a reduction in brake pipe pressure for establishing communication from a reservoir to the brake cylinder through a passage having means for controlling the flow rate, and adapted to be operated upon an increase in brake pipe pressure for establishing communication from the brake cylinder to the atmosphere through another passage bypassing the brake cylinder supply passage.

Another object of the invention is to provide valve mechanism of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, mostly in section, of a valve mechanism embodying the invention.

Referring to the drawing, the equipment may comprise a service valve device 1, an emergency valve device 2, a quick action valve device 3, a high pressure valve device 4, a safety valve device 5, an auxiliary reservoir 6, an emergency reservoir 7, and a brake cylinder 8.

The service valve device 1 may comprise a casing detachably mounted on a bracket, or other suitable supporting member 9 and having a piston chamber 10 connected to the usual brake pipe 11 by passages 12 and 26 and containing a piston 13 and having a valve chamber 14, connected by a passage and pipe 15 to the auxiliary reservoir 6 and containing a main slide valve 16 and an auxiliary slide valve 17 adapted to be operated by piston 13.

The main slide valve 16 is provided with a port 18 adapted to register with a passage and pipe 19 leading to the emergency reservoir 7. For the purpose of controlling the rate of flow through the passage 19, a choke plug 20 is removably mounted in the bracket 9 adjacent to the adjoining face of the casing of the service valve device 1.

The piston chamber 10, above the piston 13 when the piston is in release position, as shown in the drawing, is connected to the passage 19 by a passage 21, chamber 22 containing a ball check valve 23, and passage 24.

The emergency valve device 2 may comprise a piston chamber 25 connected to the brake pipe 11 through a passage 26 and containing a piston 27 and having a valve chamber 28 connected to a quick action chamber 29 and containing a main slide valve 30 and an auxiliary slide valve 31 adapted to be operated by piston 27.

The main slide valve 30 is provided with a port 32 adapted to register with a passage 33 which leads to passage 26.

The auxiliary slide valve 31 is provided with a cavity 34 containing a ball check valve 35, the purpose of which will be hereinafter more fully described.

When the piston 27 is in the release position shown in the drawing, port 36 which connects cavity 34 with the seat of the auxiliary valve 31, registers with port 32, to provide a communication around the ball 35 through which the valve chamber 28 and the quick action chamber 29 are charged with fluid under pressure from the brake pipe 11.

The quick action valve device 3 may comprise a piston 37 contained in piston chamber 38, said chamber having a passage 39 which leads to the seat of slide valve 30.

The piston 37 is adapted to operate a vent valve 40 for venting fluid from the brake pipe passage 26 to an atmospheric exhaust port 41. The passage 39 registers with a port 42 in the slide valve 30, when the device is in release position.

The high pressure valve device 4 may comprise a piston 43 contained in piston chamber 44, said chamber having a passage 45 which is connected to the passage 39 heretofore referred to.

The face of the piston 43, on the side opposite to the chamber 44, is formed with a seat rib 46 for engaging a gasket 47, so as to cut off communication between chamber 48 and a valve chamber 49 containing a valve 50. The chamber 49 has a passage 51 which leads to an exhaust port 52.

The valve 50 has a stem extending through a suitable bore 53 and engaging in a chamber 54, the fluted stem 55 of a valve 56 contained in chamber 57. The fluted stem 55 is mounted in a suitable bore 58 formed between the chambers 54 and 57. A spring 59, contained in chamber 57, acts on the valve 56, tending to seat the same and unseat the valve 50. The chamber 57 has a passage 60, which leads to the passage 19 heretofore referred to.

The safety valve device 5 may comprise a valve piston 61, contained in a chamber 62, said valve piston being adapted to seat upon extreme movement in either direction and is subject on one side to the pressure of a spring 63.

A chamber 64 on the spring side of the valve piston 61, is connected to the brake cylinder 8 by a passage and pipe 65. The chamber 64 is also connected to a passage 66, and communication from passage 66 to the chamber 67 of the safety valve device, is controlled by a poppet valve 68. The spring side of the valve piston 61 is provided with a stem 69 for engaging the poppet valve 68, which poppet valve is normally seated against a seat 70 to shut off communication through the passage 66.

In operation, when the piston 13 is in release position, as shown in the drawing, the valve chamber 14 is charged from the brake pipe 11 in the usual manner by way of the usual feed groove 71, around piston 13.

The auxiliary reservoir 6 is charged from the valve chamber 14 through passage and pipe 15.

The emergency reservoir 7 is charged from the piston chamber 10 through passage 21, past ball check valve 23 in chamber 22, passage 24, and passage and pipe 19.

Chamber 57, being connected to the emergency reservoir 7 through passages 19 and 60, is charged with fluid from the emergency reservoir.

The valve chamber 28 of the emergency valve device 2 is also charged from the brake pipe 11 through passage 26, passage 33, port 32 in the main slide valve 30, port 36 in the auxiliary slide valve 31, and past ball 35 in the cavity 34. The fluid under pressure in valve chamber 28 flows through passage 72 and charges the quick action chamber 29 at brake pipe pressure.

The piston chamber 25 of the emergency valve device 2 is also charged from the brake pipe 11 through passage 26.

Chamber 73 of the quick action valve device 3 is charged with fluid at brake pipe pressure through passage 74 leading from the passage 26.

With the apparatus thus charged with fluid under pressure from the brake pipe 11, the brake cylinder 8 is at atmospheric pressure, due to the connection through pipe and passage 65, passage 75, port 76 in the main slide valve 16, cavity 77 in the auxiliary slide valve 17, port 78 in the main slide valve 16, and the atmospheric passage 79 containing a choke plug 80. Likewise chamber 64 is vented to the atmosphere through passage 81, which leads to passage 65.

After the apparatus is charged with fluid under pressure from the brake pipe 11, in the manner described, if it is desired to effect a service application of the brakes, the brake pipe pressure is gradually reduced in the usual manner, and consequently the pressure in piston chamber 10 is reduced to the same extent.

As the pressure of the fluid in the valve chamber 14 will then exceed the pressure of the fluid in piston chamber 10, piston 13 will be moved toward the usual service position and communication from piston chamber 10 to the valve chamber 14 through the feed groove 71 will be cut off.

The movement of the piston 13 toward service position causes a corresponding movement of the auxiliary slide valve 17, while the main slide valve 16 remains stationary until the piston 13 has moved a predetermined amount and a shoulder 82 on the piston stem engages the main slide valve 16 and the latter will then be moved to service position.

The initial movement of the piston 13 causes the auxiliary slide valve 17 to lap the port 18 in the main slide valve 16, thereby cutting off communication from the valve chamber 14 to the emergency reservoir 7 and to the valve chamber 57, through passage 19.

The brake cylinder 8, which is open to the atmosphere when the device is in release position, will be shut off from this connection when the ports 76 and 78 of the main slide valve 16 are lapped by the auxiliary slide valve 17 when the latter is moved by the piston 13.

When the shoulder 82 engages the main slide valve 16, and the latter is moved by the piston 13, passages 75, 79, and 19 will be lapped, and when the main slide valve 16 is in service position, port 83 in said slide valve will register with a passage 84 containing a choke plug 85.

In service position, the valve chamber 14 will be connected to the brake cylinder 8 through port 83, and passages 84, 75 and 65. Fluid under pressure then flows from the auxiliary reservoir 6, through pipe and passage 15 to the valve chamber 14, and from thence to the brake cylinder 8, thereby effecting a service application of the brakes in the usual manner. In the present case, the flow rate of the fluid flowing from the auxiliary reservoir 6 to the brake cylinder 8 is controlled by the size of the orifice in the choke plug 85.

Since chamber 64 is connected to the passage 65 by passage 81, chamber 64 will also be supplied with fluid at brake cylinder pressure. From chamber 64, the fluid flows through passage 66 to the head of the valve 68 of the safety valve device 5.

As the valve piston 61 will be maintained on its seat by the pressure of the fluid in chamber 64, plus the pressure exerted by spring 63, leakage or fluid past the seat of the valve piston 61 will be prevented, and the pressure will consequently build up against the valve 68.

In as much as the safety valve device 5 is adapted to be actuated, during a service application of the brakes, to relieve an excess of fluid pressure which may be supplied to the brake cylinder 8 from the auxiliary reservoir 6, should the pressure of the fluid in chamber 64 exceed the predetermined pressure which tends to hold the valve 68 seated, then the valve 68 will be unseated, and the excess fluid will flow from chamber 64 into chamber 67, and from thence to the atmosphere through opening 86 in the safety valve device 5.

In this way the maximum pressure of the fluid admitted to the brake cylinder 8 during a service application of the brakes will be limited, because the safety valve device 5 will operate automatically to relieve the pressure of the fluid in excess of a predetermined amount.

When a service application of the brakes is being effected in the manner hereinbefore described, when the brake pipe pressure is reduced in the passage 12, the fluid pressure in the emergency piston chamber 25 will also be reduced.

When the pressure of the fluid in piston chamber 25 is reduced a predetermined amount, the pressure of the fluid in valve chamber 28 will force the piston 27 toward the right until a port 87 in the auxiliary slide valve 31 registers with a port 88 in the main slide valve 30, whereupon fluid under pressure from the quick action chamber 29 will be vented to the atmosphere through passage 72, valve chamber 28, ports 87 and 88, and atmospheric passage 89.

In the movement of the auxiliary slide valve 31 relative to the main slide valve 30, cavity 90 in the auxiliary slide valve 31 will be moved to the right so as to connect ports 32 and 91 in the main slide valve 30. The fluid under pressure will then flow to the brake cylinder 8 from the brake pipe through passages 33, port 32, cavity 90, port 91, passage 92, past ball check valve 93 in chamber 94, and passage 95 leading to passage and pipe 65, said passage 95 containing a choke plug 96.

In this way a local reduction of brake pipe pressure is produced, thereby causing the usual quick service action to be propagated serially throughout the train.

When the pressure of the fluid in the quick action chamber 29 and in the valve chamber 28 has been reduced to a degree slightly less than the reduced brake pipe pressure, piston 27 will be moved back to release position by the higher brake pipe pressure in the piston chamber 25.

The movement of the piston 27 to the left causes the auxiliary slide valve 31 to lap the port 88 in the main slide valve 30, and thereby prevent further reduction of the pressure of the fluid in the quick action chamber 29 until the brake pipe pressure is further reduced, when the actuating of the piston 27 and the parts operated thereby will be repeated, as will be readily understood. The pressures on the piston 27 are thus kept substantially balanced so that a service rate of reduction in brake pipe pressure will not cause an emergency application of the brakes.

When the piston 13 is moved to effect a service application of the brakes, in the manner hereinbefore explained, the fluid under pressure will be prevented from flowing from the emergency reservoir 7 through pipe and passage 19, and passage 24 to the piston chamber 10 by the ball check valve 23.

Likewise, the auxiliary slide valve 17 will lap the port 18, when the movement of the piston 13 to service position is initiated, so as to shut off communication from the emergency reservoir 7 through passage 19 and port 18 to the valve chamber 14.

In this way the fluid under pressure in the emergency reservoir 7 will be prevented from blowing back to the brake pipe 11 when a brake pipe reduction is made to effect a service application of the brakes.

In order to hold the brakes applied after a service application, the operator moves the brake valve (not shown) to lap position so that further escape of fluid from the brake pipe 11 will be prevented.

When the flow of fluid from the auxiliary reservoir 6 to the brake cylinder 8 has reduced the pressure in valve chamber 14 slightly below the pressure of the fluid in piston chamber 10, the higher brake pipe pressure in said piston chamber will move the piston 13 and auxiliary slide valve 17 backwardly toward release position until a shoulder 97 on the stem of the piston 13 engages the adjacent end of the main slide valve 16. In this position, port 83 will be lapped by the auxiliary slide valve 17 and flow of fluid to the brake cylinder 8 by way of passages 84, 75 and 65 is thereby stopped. Further movement of the piston 13 and auxiliary slide valve 17 toward release position is prevented by the main slide valve 16. The slight difference of pressure which was sufficient to move the piston 13 and the auxiliary slide valve 17 is unable to overcome the added resistance of the main slide valve 16, hence there is no further movement.

It will be noted that the main slide valve 16 remains in service position, a movement of the piston 13 and auxiliary slide valve 17 only being required to lap the slide valve 16. Consequently, when in this position, but a slight reduction in brake pipe pressure is required to again bring the piston 13 and auxiliary slide valve 17 into service position. In this manner the brakes may be graduated on in steps, by stepping down the brake pipe pressure and causing corresponding increases in brake cylinder pressure.

When it is desired to release the brakes, the brake valve (not shown) is operated to increase the fluid pressure in the brake pipe 11 and thereby increase the fluid pressure in the piston chamber 10. When the pressure in chamber 10 has been increased a predetermined amount, sufficient force is exerted upon the piston 13 to move this piston and the main slide valve 16 and auxiliary slide valve 17 toward release position. Further movement in this direction by the piston 13 will be prevented when the piston head engages a stop 98. The main slide valve 16 and the auxiliary slide valve 17 will now be positioned as shown in the drawing, whereupon the fluid in brake cylinder 8 will exhaust to the atmosphere by way of pipe and passage 65, passage 75, port 76, cavity 77 in the auxiliary slide valve 17, port 78, and atmospheric passage 79. The choke plug 80 in the passage 79 will control the rate of blow down of the fluid from the brake cylinder 8, as will be readily understood.

When the parts are returned to release position, the equipment will again be recharged in the manner heretofore described.

If it is desired to graduate the release of the brakes, the brake pipe pressure may be gradually increased to cause the piston 13 to move to release position, in which the slide valves 16 and 17 will be positioned, as shown in the drawing, so that the fluid in the brake cylinder 8 will be permitted to flow to the atmosphere as has been described.

However, in as much as communication will be established between the emergency reservoir 7 and valve chamber 14 by way of pipe and passage 19 and port 18 in the main slide valve 16 when the piston 13 is in release position, a pressure will be built up in valve chamber 14 an amount sufficient to overcome the increase in brake pipe pressure and move the piston 13 outwardly toward release lap position.

This action will cause the auxiliary slide valve 17 to lap port 18 so that communication from the emergency reservoir 7 to the valve chamber 14 will be cut off. Furthermore, ports 76 and 78 in the main slide valve 16 will be lapped by the auxiliary slide valve 17, because the main slide valve 16 will remain in release position, and therefore the further exhaust of fluid from the brake cylinder 8 to the atmosphere will be prevented, and the fluid remaining in the brake cylinder is retained.

In this way by successively stepping up brake pipe pressure, the brake cylinder pressure can be released in successive steps.

When a sudden reduction in brake pipe pressure is made to effect an emergency application of the brakes, the piston 13 and the slide valves 16 and 17 operated thereby will be moved to service position in the manner hereinbefore described, so as to supply the brake cylinder 8 with fluid under pressure from the auxiliary reservoir 6.

The emergency piston 27 will also be shifted quickly to the right, compressing the spring stop 99 and engaging the seat 100. When the piston 27 engages the spring stop 99, its movement to the right may be momentarily retarded by said stop. However, in order to prevent such a hesitation in the piston movement from retarding the emergency propagation, port 42 in the main slide valve 30 will be uncovered by the movement to the right of the auxiliary slide valve 31, thereby permitting fluid under pressure from the quick action chamber 29 to be supplied to the high pressure valve device 4 and to the quick action valve device 3 for the purpose to be hereinafter described.

When the piston 27 is moved to the right, the main slide valve 30 will be moved to connect passage 39 with the valve chamber 28, thereby permitting fluid under pressure from the quick action chamber 29 to flow through passage 39 to chamber 38 of the quick action valve device 3 and to chamber 44 of the high pressure valve device 4, and respectively force the quick action piston 37 and the high pressure valve piston 43 upwardly.

The upward movement of piston 37 will unseat the vent valve 40, so as to cause a quick serial venting of the brake pipe in the usual manner.

The upward movement of piston 43 will seat valve 50 and unseat valve 56. Fluid under pressure will then flow from the emergency reservoir 7, through pipe and passage 19, passage 60, chamber 57, bore 58, chamber 54, passage 101, past ball check valve 102, and passage 103, to chamber 104. When the piston 43 is moved upwardly to unseat the valve 56 and seat the valve 50, the seat rib 46 of the piston 43 engages the seating gasket 47, so as to prevent leakage of fluid from the chamber below the piston to the chamber 48 above the piston 43, which is open to the atmosphere by way of passage 52.

In order to insure the seating of the valve 50 when the seat rib 46 engages the gasket 47, the piston 43 is provided with means for permitting movement of the piston relative to the valve 50, which means includes a cage 200, carried by the piston 43, and into which extends a stem 201, carried by the valve 50. Mounted in the cage 200, between the end of the stem 201 and a face of the piston 43 is a coil spring 202, through which spring the piston 43 acts to move the valve 50 to its seat. It will thus be seen that after the valve 50 seats, the piston 43 can move telescopically relatively to the valve until the seat rib 46 engages the seating gasket 47.

When the pressure of the fluid in chamber 104 has increased a predetermined amount, the valve piston 61 will be unseated from the seat rib 105, against the force exerted by spring 63, thereby permitting fluid under pressure to flow from the emergency reservoir 7 to chamber 62. The valve piston 61 will be moved downwardly until a seat rib 106 at the lower side of the valve piston engages seat 107. In this position fluid under pressure will be prevented from flowing through passage 66 toward valve 68 of the safety valve device 5.

With the valve piston 61 thus lowered, port 108 will be uncovered, and fluid under pressure from the emergency reservoir 7 is permitted to flow to the brake cylinder 8 by way of passage and pipe 65.

The almost simultaneous movement of the piston 27 with the outward movement of the piston 13 permits the immediate flow of fluid under pressure from the emergency reservoir 7 to the brake cylinder 8 in addition to the usual supply of fluid under pressure from the auxiliary reservoir 6, so that a high pressure is quickly secured in the brake cylinder as soon as an emergency application of the brakes is initiated.

When the valve piston 61 is moved downwardly to uncover the port 108 and the lower portion of the valve piston is seated against the seat 107, communication to the safety valve device 5 through passage 66 will be cut off, so as to prevent a reduction in the high brake cylinder pressure obtained in the emergency application of the brakes.

With the face of piston 27 engaging seat 100 and the pistons 37 and 43 shifted to their upper positions respectively, the fluid under pressure supplied from the quick action chamber 29 to operate said pistons will gradually exhaust to the atmosphere through port 109 in piston 37, chamber 110, passage 111, chamber 112 and atmospheric passage 41. When the pressure in the quick action chamber 29 which is effective in valve chamber 28 becomes reduced a predetermined amount, the spring stop 99 will force the piston 27 and slide valves 30 and 31 toward release position.

When the pressure of the fluid in chambers 38 and 44 has been reduced, the pressure of spring 59 acting on valve 56, seats said valve, thereby unseating valve 50 and returning piston 43 to its normal position.

At substantially the same time that piston 43 is returned to its normal position, spring 113 forces vent valve 40 to its seat, thereby closing the atmospheric connection from the brake pipe.

With valve 50 unseated, the ball check valve 102 prevents back flow from the brake cylinder 8, through port 108, past the unseated valve piston 61, through passage 103 to chamber 54, which chamber is connected to the atmosphere past the sliding stem of valve 50, chamber 49, passage 51, and atmospheric exhaust port 52.

In recharging, upon movement of the brake valve to release position, fluid flows from the brake pipe 11, through pipe and passage 12 to the piston chamber 10 of the service valve device 1 and also through passage 26 to the piston chamber 25 of the emergency valve device 2, so as to respectively shift the pistons 13 and 27 and their connected slide valves to their release and normal positions.

With piston 13 in release position, fluid under pressure is supplied from piston chamber 10, through feed groove 71 and passage 21, to the valve chamber 14, auxiliary reservoir 6, and emergency reservoir 7, thereby charging the same in the manner hereinbefore described. In this position the brake cylinder 8 is connected to atmosphere through pipe and passage 65, passage 75, port 76, cavity 77 in the auxiliary slide valve 17, port 78, and atmospheric exhaust passage 79, past choke plug 80, thereby permitting the brakes to release.

With the piston 27 in normal position, fluid under pressure is supplied from the brake pipe passage 26, through passage 33, ports 32 and 36, past ball check valve 35, to the valve chamber 28 and from thence through passage 72 to the quick action chamber 29, thereby recharging the emergency valve device portion of the apparatus in the manner hereinbefore described.

It will be noted that the valve chamber 28 and quick action chamber 29 are charged through a passage controlled by the slide valves 30 and 31, and that a check valve (ball 35) is employed in the slide valve 31 to prevent back flow from the valve chamber 28 to the passage 26 from the brake pipe. In this way the piston 27 is more sensitive to a very slow drop in brake pipe pressure than would be the case if communication through the slide valve ports was not controlled by the check valve.

Heretofore, in valve devices of the type above described, it has been the practice to construct the apparatus in sizes suitable for each different size of equipment and to control the rate of flow of the fluid to and from the brake cylinder and other parts of the equipment by ports in the slide valves and their seats. Hence, the use of each valve device was limited to the particular size of equipment for which the valve device was designed.

Therefore, it will be readily understood, that it was necessary to produce specially designed valve devices for each size of equipment, because a valve device designed to be used with a small equipment was unsuited for use with the large equipments, since insufficient flow area would be had, and vice versa, a valve device designed for use with the large equipments would be unsuitable for use with the small equipments, as too much flow area would be provided.

Accordingly, one of the features of the present invention resides in the particular design of the service valve device 1, by which the choke plugs 20, 80 and 85 are placed adjacent to the face of the bracket 9 so as to be conveniently disposed for removal and replacement. In this way the passages, ports, and valve cavities of the service valve device 1 can be manufactured of a size suitable for use in the largest equipments, and the flow rate can be controlled by installing the proper sizes of choke plugs.

Through the use of the above improvements, it will be obvious that the devices can be produced in large quantities, and be used with any size equipment by installing choke plugs of the proper size for controlling the flow rate through the various passages.

As a result of the above type of design, it is necessary to have two passages from the brake cylinder in which to place chokes, one for service and one for release, and both of these passages must pass through the gasket face between the service valve device 1 and the bracket 9, so that the choke plugs will be accessible for removal and replacement.

Furthermore, on account of change in reservoir volumes in accordance with the brake cylinder volume, it is necessary to have a choke from the emergency reservoir to govern the rate of recharge in graduated release, in order to obtain proper timing.

When the graduated release is being effected in the manner above described, if the rate of recharge from the emergency reservoir 7 to the auxiliary reservoir 6 is too slow, the piston 13 and the valves 16 and 17 operated thereby, would not move quick enough to lap position to cut off the brake cylinder exhaust. Therefore, all of the brake cylinder pressure might be lost to the atmosphere.

In case the rate of back flow from the emergency reservoir 7 to the auxiliary reservoir 6 exceeded the rate of increase in brake pipe pressure, then the piston 13 and the valves 16 and 17 operated thereby, would not move back to release position, and therefore there would be no reduction in brake cylinder pressure. As a result, choke plug 20 must be of such size as to permit a back flow and consequently an increase in auxiliary reservoir pressure at a rate slightly less than the rate of increase in brake pipe pressure, so as to insure the piston 13 and the valves 16 and 17 operated thereby, moving to release position, but also to cause the piston 13 and the valves 16 and 17 to move to lap position in graduating the release of the brakes, in order to permit only a decrease in brake cylinder pressure in proportion to the increase in brake pipe pressure. Therefore, in order to obtain the same rate of back flow with various sizes of auxiliary and emergency reservoirs, depending upon the sizes of brake cylinders employed, it is necessary to install choke plug 20 in the passage 19 leading from the valve chamber 14 to the emergency reservoir 7.

Another feature of the invention is the provision of a quick action valve device for venting fluid from the brake pipe, a valve device for controlling the supply of fluid from a reservoir to the brake cylinder, and means operated upon a sudden reduction in brake pipe pressure for supplying fluid under pressure to simultaneously operate both valve devices.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, a brake pipe, and a source of fluid under pressure, of a valve device operated upon a gradual reduction in brake pipe pressure for supplying fluid under pressure to the brake cylinder, valve means operated by an increase in fluid under pressure for supplying fluid from said source to the brake cylinder, and a valve device operated upon a sudden reduction in brake pipe pressure for supplying fluid under pressure to operate said valve means.

2. In a fluid pressure brake, the combination with a brake cylinder, a brake pipe, and a source of fluid under pressure, of a valve for controlling the supply of fluid from said source to the brake cylinder, a piston normally subject on one side to atmospheric pressure and operated by an increase in fluid pressure on the opposite side for opening said valve, a valve operated by said piston for preventing flow of fluid under pressure from said source to the atmospheric side of said piston, and a valve device operated upon a sudden reduction in brake pipe pressure for supplying fluid under pressure to said piston.

3. In a fluid pressure brake, the combination with a brake pipe, of a main valve, an auxiliary valve, a piston subject to the opposing pressures of the brake pipe and a chamber and operated upon a sudden reduction in brake pipe pressure for operating said valves to effect an emergency application of the brakes, and a check valve mounted in said auxiliary valve for preventing back flow from said chamber to the brake pipe, through a communication controlled by said valves and through which fluid under pressure is supplied from the brake pipe to said chamber.

4. In a fluid pressure brake, the combination with a brake pipe, of a main valve, an auxiliary valve having a movement relative to the main valve, the main valve being operative to effect an emergency application of the brakes, a piston subject to the opposing pressures of the brake pipe and a chamber and operated upon a sudden reduction in brake pipe pressure for operating said valves, and a check valve mounted in said auxiliary valve for preventing back flow from said chamber to the brake pipe through a communication controlled by said valves and through which fluid under pressure is supplied from the brake pipe to said chamber.

5. In a fluid pressure brake, the combination with a brake pipe, auxiliary reservoir, brake cylinder, and a supplemental reservoir, of a valve device subject to the opposing pressures of the brake pipe and auxiliary reservoir for controlling the admission and release of fluid under pressure to and from the brake cylinder, and adapted in release position to establish communication from said supplemental reservoir to the auxiliary reservoir and means separate from said valve device for controlling the rate of flow of fluid from the supplemental reservoir to the auxiliary reservoir.

6. In a fluid pressure brake, the combination with a brake pipe, auxiliary reservoir, brake cylinder, and a supplemental reservoir, of a valve device subject to the opposing pressures of the brake pipe and auxiliary reservoir for controlling the admission and release of fluid under pressure to and from the brake cylinder, and adapted in release position to establish communication from said supplemental reservoir to the auxiliary reservoir and a removable choke plug having a restricted passage for controlling the rate of flow of fluid from the supplemental reservoir to the auxiliary reservoir.

7. In a fluid pressure brake, the combination with a brake pipe, and a valve mechanism operated upon a gradual reduction in brake pipe pressure for effecting a service application of the brakes, of an emergency valve mechanism comprising a valve and a piston subject to the opposing pressures of the brake pipe and a chamber for operating said valve upon a sudden reduction in brake pipe pressure, a port in said valve through which fluid under pressure is supplied to said chamber from the brake pipe, and a check valve for preventing back flow through said port.

8. In a fluid pressure brake, a brake pipe, a reservoir, a brake cylinder, a valve device having a chamber in communication with the brake pipe and a piston for operating said valve device whereby the brake pipe fluid is vented to the atmosphere, a second valve device comprising a piston and a double beat valve for controlling communication between the reservoir and the brake cylinder, and valve mechanism operable upon a reduction in brake pipe pressure and comprising a valve chamber and a quick action chamber connected thereto, for supplying fluid from the quick action chamber to operate both of said pistons simultaneously.

9. In a fluid pressure brake, the combination with a brake pipe and a brake cylinder, of valve means for supplying fluid under pressure to the brake cylinder to effect a service application of the brakes, a valve device operated upon a predetermined increase in pressure for relieving the pressure of the fluid supplied to said brake cylinder, an emergency valve device operated upon a sudden reduction in brake pipe pressure for disconnecting said pressure valve device from the service application valve means and for establishing a communication whereby fluid under pressure is supplied to said brake cylinder to effect an emergency application of the brakes, and means for preventing back flow through said communication from the brake cylinder.

10. A brake controlling valve device comprising a valve mechanism operating upon a gradual reduction in train pipe pressure for effecting a service application of the brakes, a valve mechanism for effecting an emergency application of the brakes, means for limiting the fluid pressure in the brake cylinder when the service application valve mechanism is actuated to effect a service application of the brakes, means for cutting off the pressure limiting means when the emergency application valve mechanism is actuated to effect an emergency application of the brakes, and means for maintaining high brake cylinder pressure when an application of the brakes is effected.

11. In a fluid pressure brake, the combination with a brake cylinder and a brake pipe, of a valve device for controlling a passage through which fluid is supplied from the auxiliary reservoir to the brake cylinder in service applications, a safety valve for limiting the pressure in the brake cylinder, an emergency reservoir normally disconnected from said brake cylinder passage, an emergency valve mechanism operating upon a sudden reduction in brake pipe pressure for cutting off said safety valve and for connecting said emergency reservoir to the brake cylinder passage, and a check valve device for preventing back flow from the brake cylinder when said emergency reservoir is connected thereto.

12. In a fluid pressure brake, the combination with a brake pipe, of an emergency valve device comprising a piston subject to the opposing pressures of the brake pipe and a chamber, valve means operated by said piston upon a sudden reduction in brake pipe pressure for effecting an emergency application of the brakes, said valve means controlling communication through which fluid under pressure is supplied from the brake pipe to said chamber, and a check valve associated with said valve means for preventing back flow from said chamber to the brake pipe.

13. In a fluid pressure brake, the combination with a brake pipe, of an emergency valve device comprising a piston subject to the opposing pressures of the brake pipe and a chamber, a main slide valve and an auxiliary valve operated by said piston, said valves controlling communication through which fluid under pressure is supplied from the brake pipe to said chamber, and a check valve carried by the auxiliary valve for preventing back flow through said communication from said chamber to the brake pipe.

14. In a fluid pressure brake, the combination with a brake pipe and a reservoir normally charged with fluid under pressure, of a valve operative to supply fluid under pressure from said reservoir for effecting an application of the brakes, a piston subject on one side to atmospheric pressure and movable by an increase in fluid pressure on the opposite side for operating said valve, means operated by said piston upon the operation of said valve for preventing flow of fluid under pressure from said reservoir to the atmospheric side of said piston, a valve device operated upon a reduction in brake pipe pressure to supply fluid under pressure for moving said piston, and a gasket engageable by said piston for preventing leakage of actuating fluid to the atmospheric side of said piston.

15. In a fluid pressure brake, the combination with a brake pipe and a reservoir normally charged with fluid under pressure, of a supply valve contained in a chamber communicating with said reservoir and operative to supply fluid under pressure from said reservoir to a passage through which fluid under pressure flows to effect an application of the brakes, an oppositely disposed valve contained in an atmospheric chamber and operative to open said supply valve and at the same time close communication from said passage to said atmospheric chamber, a piston open at one side to said atmospheric chamber and movable by fluid under pressure supplied to the opposite side for operating said valves, a gasket, means for permitting said piston to move relatively to said valves and into engagement with said gasket, and a valve device operated upon a reduction in brake pipe pressure to supply fluid under pressure for operating said piston.

16. In a fluid pressure brake, the combination with a brake pipe and a reservoir normally charged with fluid under pressure, of a supply valve contained in a chamber communicating with said reservoir and operative to supply fluid under pressure from said reservoir to a passage through which fluid under pressure flows to effect an application of the brakes, an oppositely disposed valve contained in an atmospheric chamber and operative to open said supply valve and at the same time close communication from said passage to said atmospheric chamber, a piston open at one side to said atmospheric chamber and movable by fluid under pressure supplied to the opposite side for operating said valves, a gasket, means for permitting said piston to move relatively to said valves and into engagement with said gasket, a restricted opening for venting actuating fluid from the one side of said piston at a predetermined rate, and a valve device operated upon a reduction in brake pipe pressure to supply fluid under pressure for actuating said piston.

17. In a fluid pressure brake, the combination with a brake pipe and a reservoir normally charged with fluid under pressure, of a supply valve contained in a chamber communicating with said reservoir and operative to supply fluid under pressure from said reservoir to a passage through which fluid under pressure flows to effect an application of the brakes, an oppositely disposed valve contained in an atmospheric chamber and operative to open said supply valve and at the same time close communication from said passage to said atmospheric chamber, a gasket, a piston telescopically connected to the last mentioned valve and open at one side to said atmospheric chamber, said piston being movable by fluid under pressure supplied to the opposite side for operating said valves and for effecting a seal on said gasket, and valve means operated upon a reduction in brake pipe pressure to supply fluid under pressure for operating said piston.

JOSEPH C. McCUNE.